Figure 1:
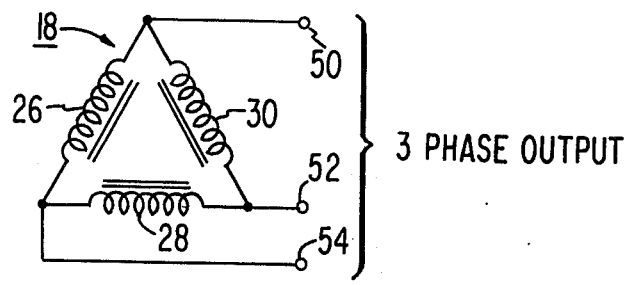
Figure 1:
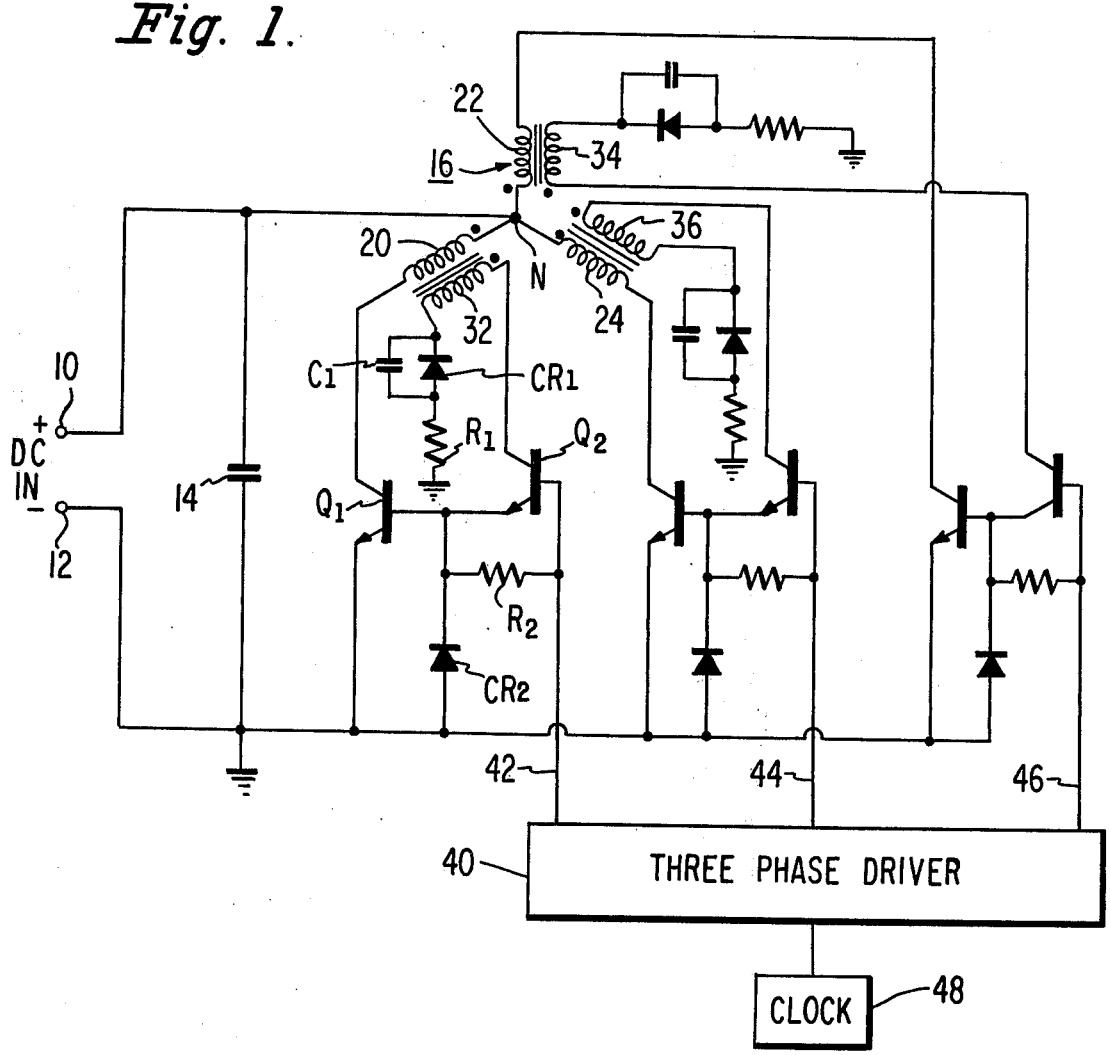

United States Patent [19]
Lachocki

[11] 3,879,650
[45] Apr. 22, 1975

[54] DC TO POLYPHASE INVERTER UTILIZING A PLURALITY OF SWITCHING DEVICE AND A TRANSFORMER HAVING A PLURALITY OF PRIMARY AND FEEDBACK WINDINGS CONNECTED IN CIRCUIT WITH THE SWITCHING DEVICE

[75] Inventor: Eugene Lachocki, Turnersville, N.J.
[73] Assignee: RCA Corporation, New York, N.Y.
[22] Filed: Aug. 1, 1973
[21] Appl. No.: 384,710

[52] U.S. Cl. ................. 321/5; 321/18; 321/45 R
[51] Int. Cl. .................................... H02m 7/48
[58] Field of Search ................ 321/2, 5, 45 R, 18

[56] References Cited
UNITED STATES PATENTS
3,758,841 9/1973 Bourbeau ..................... 321/18 X
3,775,662 11/1973 Compoly et al. ..................... 321/5
3,792,337 2/1974 Gilmore ............................. 321/2

*Primary Examiner*—Gerald Goldberg
*Attorney, Agent, or Firm*—J. S. Tripoli; E. J. Norton

[57] ABSTRACT

A DC to polyphase inverter is disclosed having a transformer with a plurality of primary and secondary windings. The DC input voltage is applied to each of the primary windings of the transformer. Each primary winding is connected in circuit with a switch. Each of the switches are operated such that the conduction time of each switch is related to the conduction time of each other switch in a predetermined fashion. The secondary windings are arranged to provide a polyphase output signal, that is, a plurality of output signals bearing a specified phase relationship one to another.

11 Claims, 5 Drawing Figures

PATENTED APR 22 1975 3,879,650

DC TO POLYPHASE INVERTER UTILIZING A PLURALITY OF SWITCHING DEVICE AND A TRANSFORMER HAVING A PLURALITY OF PRIMARY AND FEEDBACK WINDINGS CONNECTED IN CIRCUIT WITH THE SWITCHING DEVICE

The present invention relates generally to a DC to polyphase inverter and more particularly to a polyphase inverter which utilizes a transformer having a plurality of primary and secondary windings.

There are many applications where it is required to generate a polyphase signal from a DC source. In airborne equipment, for example, it is very often required to invert a DC level from a source such as a battery to a three phase, 400 Hz output signal in order to supply power to various pieces of equipment. For airborne applications it is especially desirable to utilize simple, yet efficient, inverters in view of the size, weight and volume restrictions imposed upon such equipment.

In addition, it has been found that under certain operating conditions it may be desirable to power equipment with a polyphase signal at a frequency which is slightly different from the nominal. For example, under certain noise and environmental conditions it may be desirable to operate an airborne blower motor for a power supply at 420 Hz or 380 Hz rather than the nominal 400 Hz.

The present invention provides a relatively simple, yet efficient, means for inverting a DC level and thereby providing a polyphase output signal, that is, several signals bearing a specified phase relationship to each other. In accordance with the teachings of the present invention, the frequency of the polyphase output signal is readily and easily adjustable.

In accordance with the present invention, there is provided a DC to polyphase inverter circuit. The circuit comprises a transformer having a plurality of primary windings and a plurality of secondary windings. Means are provided for applying a DC input signal to each one of the primary windings. A plurality of switching devices, each being operated between an on and an off state of current conduction, is also provided. Each one of the switching devices is connected in circuit with a corresponding one of the plurality of primary windings. In addition, switch control means is provided for controlling the state of current conduction of the switches. The conductive states of the switches bear a predetermined relationship one to another. Means associated with the secondary windings are provided for developing the polyphase output signals.

IN THE DRAWING:

FIG. 1 is a partial block and a partial schematic diagram of a preferred embodiment of the present invention; and FIGS. 2–5 are waveform diagrams associated with the operation of the circuit shown in FIG. 1.

Referring now to FIG. 1, a DC to three phase inverter is shown. A DC input level is applied to terminals 10 and 12. The DC level applied to terminals 10 and 12 will, in most cases, be a regulated voltage. Input terminal 10 is the positive voltage input terminal, whereas input terminal 12 is the negative voltage input terminal and is connected to ground potential. A large filter capacitor 14 is connected directly across terminals 10 and 12.

There is also provided a transformer having a wye primary 16 and a delta secondary 18. The wye configuration 16 comprises three primary windings, 20, 22 and 24. The primary windings 20, 22 and 24 are each joined on one end thereof to a common node point N. The delta secondary 18 of the transformer comprises three windings, 26, 28 and 30. In addition the transformer comprises three feedback windings 32, 34 and 36 each one of which is associated with a particular one of the primary windings 20, 22 and 24. Input terminal 10 is connected to node N of the wye configuration 16. Thus the DC input signal is applied to each of the primary windings 20, 22 and 24.

Each one of the primary windings 20, 22 and 24 has a switching stage and a switch driver section associated therewith. Each of the switching stages and driver sections are similar in configuration one to another. Thus, it will only be necessary to describe in detail the switching stage and driver section for the primary winding 20.

Primary winding 20 has the collector to emitter path of a switching transistor $Q_1$ connected between the other end of winding 20 and ground potential.

The feedback winding 32 which is associated with and magnetically coupled to primary winding 20 has the series combination of a resistor R1 and a diode CR1 connected from ground potential to one end thereof. A capacitor C1 is connected directly across diode CR1. The anode electrode of diode CR1 is connected to resistor R1 while the cathode electrode of diode CR1 is connected to the feedback winding 32.

The other end of feedback winding 32 is connected to the collector electrode of a driver transistor $Q_2$. The emitter electrode of driver transistor $Q_2$ is connected to the base electrode of switching transistor $Q_1$. Another resistor R2 is connected across the base emitter junction of driver transistor $Q_2$. In addition, a diode CR2 is provided having the cathode electrode thereof connected to the base electrode of switching transistor $Q_1$ and the anode electrode thereof connected to the emitter electrode of transistor $Q_1$ which is at ground potential.

A three phase driver 40 is provided for the generation of control pulses for each of the switching stages and driver sections. Driver 40 provides control signals on lines 42, 44 and 46. A clock 48 is also provided in order to supply the basic signal upon which three phase driver 40 will operate in order to provide the control signals on lines 42, 44 and 46.

Figure 2:
Figure 3:
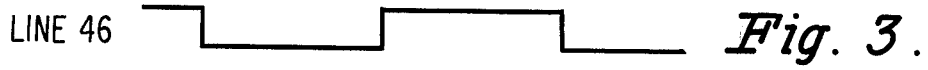
Figure 4:
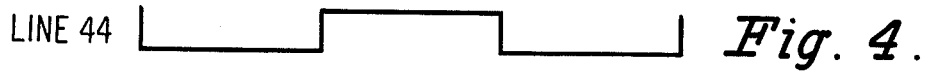
Figure 5:

FIG. 2 is a graphical representation of the clock signal provided by the clock 48. FIGS. 3, 4 and 5 show the pulse trains appearing on lines 46, 44 and 42 respectively. In this particular embodiment it will be noted that each of the signals on lines 46, 44 and 42 have a 50 percent duty cycle and are arranged to overlap one another in time in a particular manner.

The clock 48 is preferably arranged in a configuration such that the frequency of the signal provided is conveniently adjustable. Such an arrangement may take the form of a unijunction switching transistor whose control electrode is supplied from an RC time constant circuit where the resistive portion thereof is in the form of a potentiometer so that one may conveniently adjust the resistive value of the potentiometer in order to control the frequency of the clock signal.

The operation of the embodiment shown in FIG. 1 is as follows. When a positive pulse is generated on line 42 and is thereby coupled to the base electrode of driver transistor $Q_2$, transistor $Q_2$ will be slightly biased into conduction. When transistor $Q_2$ starts to conduct, current is supplied to the base electrode of the switching transistor $Q_1$ thereby transistor $Q_1$ begins to turn on. Current flow is thereby commenced from input terminal 10 to node N through winding 20 and through the collector to emitter path of transistor $Q_1$. As the current rises through winding 20 a voltage is induced in feedback winding 32. As a result of the induced voltage in feedback winding 32, current flow is increased through the collector to emitter path of the driver transistor $Q_2$. As a result, switching transistor $Q_1$ is in turn forced to conduct even greater amounts of current. This regenerative action continues until transistor $Q_1$ is driven into saturation.

At this point it should be noted that resistor R1 is provided in order to limit the amount of current flowing into the collector electrode of transistor $Q_2$ when transistor $Q_1$ reaches saturation. Diode CR1 is provided for reverse voltage protection. That is, when transistor $Q_2$ is eventually turned off there may be a reverse current flow through the feedback winding which could potentially cause damage. The capacitor C1 provides a speed up function to compensate for the recovery time associated with diode CR1. That is, diode CR1 due to its inherent recovery time may appear to be slowing down the operation of transistor $Q_2$ and $Q_1$, hence when this is the case it is desirable to use speed up capacitor C1.

Similarly, diode CR2 is provided for reverse polarity protection for the base emitter junction of transistor $Q_1$. Resistor R2 is provided to insure that driver transistor $Q_2$ will turn off completely on command.

When the base drive on line 42 is removed or goes to logic zero, the stage associated with primary winding 20 will turn off. The decreasing current in the primary winding 20 will cause the voltage induced in the feedback winding 32 to reverse polarity. The polarity reversal in feedback winding 32 helps to insure that the switching transistor $Q_1$ will be reverse biased and thus cut off sharply during the discharge cycle.

From the waveforms shown in FIGS. 3 through 5, it will be understood that the operation of each of the stages associated with windings 20, 22 and 24 will overlap in both their conduction states and in their discharge or nonconduction states. Thus, the voltages induced in the delta connected secondary 18 is really a combination of the conduction and nonconduction states which occurred in each of the primary windings in the wye connected configuration 16. The signal appearing at the circuit output terminals 50, 52 and 54 will be a semisquare wave at a particular frequency. That is, a semisquare wave signal will appear between terminals 50 and 52 at a specified frequency, in this case at a nominal 400 Hz. Likewise the signals appearing between terminals 52 and 54 and terminals 50 and 54 will be semisquare wave signals at 400 cycles, but each displaced in phase with respect to the signal appearing between terminals 50 and 52 such that a three phase output is provided.

As previously mentioned, under certain conditions and in certain applications it may be desirable to operate a particular load at some frequency other than the nominal. With the present invention, one may merely alter the clock frequency of the clock 48. The duty cycle of each of the pulse trains appearing on lines 42, 44 and 46 will remain the same, but, the actual on-time for the switching transistors, such as $Q_1$, will have been altered and the result is that the frequency of the induced voltages in the secondary windings 26, 28 and 30 will have been altered in the response thereto.

Thus the present invention provides a relatively simple and convenient means for inverting a DC input voltage level to a three phase output. In addition, the frequency of each phase of the three phase output signal is conveniently altered by a simple adjustment of the clock frequency.

What is claimed is:

1. A circuit for translating a DC input signal to polyphase time varying output signals, said circuit comprising:

a transformer having a plurality of primary windings and a plurality of secondary windings;

means for applying said DC input signal to each one of said primary windings;

a plurality of switching devices, each of said devices being operated between an on and an off state of current conduction, each one of said switching devices being connected in circuit with a corresponding one of said plurality of primary windings;

said transformer further having a plurality of feedback windings, each feedback winding being associated with a corresponding one of said primary windings, each feedback winding being connected in circuit with a corresponding one of said switching devices for providing a regenerative feedback signal in relation to the operation of said corresponding switching device;

switch control means for controlling the state of current conduction of said plurality of switching devices, the conductive state of each one of said plurality of switching devices bearing a predetermined relationship one to another; and means associated with said plurality of secondary windings for developing said polyphase output signals.

2. The circuit according to claim 1 wherein said switch control means causes each of said switching devices to conduct current for an equal interval of time with respect to each other, the occurrence of said switching device current conduction time intervals bearing a predetermined relationship to each other.

3. The circuit according to claim 1 further comprising means associated with said switch control means for selectively controlling the time intervals of the current conduction states of each of said switching devices.

4. A circuit for translating a DC input signal to three phase time varying output signals, said circuit comprising:

a transformer having three primary windings connected in a wye configuration and three secondary windings connected in a delta configuration;

means for applying said DC input signal to each one of said primary windings;

three switching devices, each of said devices being operated between an on and an off state of current conduction, each one of said switching devices being connected in circuit with a corresponding one of said primary windings;

three switch drivers, each one being connected to a corresponding one of said switching devices for driving said corresponding switching devices between said on and off current conduction conditions;

said transformer further having three feedback windings, each one of said feedback windings being associated with a corresponding one of said primary windings and being responsive to the current conduction through said corresponding primary winding, each one of said feedback windings being connected in circuit with a corresponding one of said switching devices and a corresponding one of said switch drivers for providing a regenerative feedback signal in relation to the operation of said corresponding switching device;

driver control means for controlling the operation of said three switch drivers;

said driver control means controlling said switch drivers such that each of said switching devices conducts current for a given time interval, the current conduction time interval associated with any one of said switching devices overlapping the time interval associated with any other switching device; and means associated with said secondary windings for developing said three phase output signals.

5. The circuit according to claim 4 further comprising means associated with said driver control means for selectively controlling the time intervals of the current conduction states of each of said switching devices.

6. The circuit according to claim 5 wherein said driver control means comprises a means for generating three gating pulses one on each of three lines with each gating pulse being offset in time one from another, each one of said three lines being connected to a corresponding one of said switch driver transistors.

7. A circuit for translating a DC input signal to three phase time varying output signals, said circuit comprising:

a transformer having three primary windings connected in a wye configuration and three secondary windings connected in a delta configuration;

means for applying said DC input signal between the center point of said wye configuration and a point of reference potential;

three switching circuits, each one of said switching circuits being connected between one end of one of said primary windings and said point of reference potential, each switching circuit comprising:

a. a switching transistor having two main electrodes and a control electrode, one main electrode thereof connected to said one end of said primary windings, the other main electrode thereof being connected to said point of reference potential, said switching transistor being operated between a saturated state and a cut-off state of current conduction;

b. a feedback winding, said feedback winding being transformer coupled to the corresponding primary winding, one end of said feedback winding being resistively connected to said point of reference potential; and c. a driver transistor having two main electrodes and a control electrode, one main electrode thereof being connected to the other end of said feedback winding, the other main electrode thereof being connected to the control electrode of said switching transistor;

driver control means for providing gating pulses to the control electrodes of the driver transistors in each of said three switching circuits; and means associated with said secondary windings for developing said three phase output signals.

8. The circuit according to claim 7 wherein said driver control means includes a clock signal generator having an adjustable signal frequency.

9. The circuit according to claim 7 wherein the gating pulses provided by said driver control means are of equal time intervals but offset in time one from another.

10. The circuit according to claim 7 further comprising a protective diode connected in circuit with said one end of said feedback winding.

11. The circuit according to claim 10 further comprising a speed up capacitor connected across said protective diode.

* * * * *